United States Patent [19]

Beasley

[11] Patent Number: 5,678,177
[45] Date of Patent: Oct. 14, 1997

[54] RF REPEATERS FOR TIME DIVISION DUPLEX CORDLESS TELEPHONE SYSTEM

[75] Inventor: Andrew Beasley, Lake Errock, Canada

[73] Assignee: 2777321 Canada Ltd., Vancouver, Canada

[21] Appl. No.: 360,728

[22] PCT Filed: Jul. 9, 1993

[86] PCT No.: PCT/CA93/00287

§ 371 Date: Mar. 27, 1995

§ 102(e) Date: Mar. 27, 1995

[87] PCT Pub. No.: WO94/01941

PCT Pub. Date: Jan. 20, 1994

[51] Int. Cl.$^6$ .................................................. H04B 7/212
[52] U.S. Cl. ........................... 455/16; 455/14; 455/17; 455/33.4; 370/279; 370/293; 379/61
[58] Field of Search .......................... 455/11.1, 14, 15, 455/16, 17, 19, 33.1–33.2, 33.3, 13.1, 20, 33.4; 379/61, 58, 59; 370/279, 293

[56] References Cited

U.S. PATENT DOCUMENTS

| | | | |
|---|---|---|---|
| 4,234,959 | 11/1980 | Andrea, III et al. | 455/11 |
| 5,187,803 | 2/1993 | Sohner et al. | 455/14 |
| 5,321,736 | 6/1994 | Beasley | 455/14 |
| 5,369,728 | 11/1994 | Kawano et al. | 455/16 |
| 5,377,255 | 12/1994 | Beasley | 455/17 |

FOREIGN PATENT DOCUMENTS

| | | |
|---|---|---|
| 2059370 | 1/1992 | Canada . |
| 2059370 | 7/1992 | Canada . |
| 0112409 | 12/1982 | European Pat. Off. . |
| 0240051 | 3/1987 | European Pat. Off. . |
| 0421602 | 8/1990 | European Pat. Off. . |
| 0442259 | 1/1991 | European Pat. Off. . |
| 2482339 | 5/1980 | France . |
| 2144309 | 7/1983 | United Kingdom . |

*Primary Examiner*—Chi H. Pham
*Attorney, Agent, or Firm*—Graham & James LLP

[57] ABSTRACT

The object of the invention is to employ a single amplifier for both the transmit and the receive signals in an RF repeater for interfacing with a base station for exchanging transmit and receive signals in a time division duplex cordless telephone system. A multicarrier amplifier having an input and an output and a transfer switch connected to the amplifier output and the amplifier input and having first and second switch states. The operation of the switch is controlled so that the transmit and receive signals are amplified by the amplifier. The other object is to chain RF repeaters so that the handset can roam over a roamer corridor covered by the RF repeaters. The RF repeaters are provided with a dedicated signal link.

8 Claims, 12 Drawing Sheets

RF REPEATERS FOR TIME DIVISION DUPLEX CORDLESS TELEPHONE SYSTEM

TECHNICAL FIELD

The present invention relates to RF repeaters for use in cordless telephone systems and, more particularly, for interfacing with cordless handsets and cordless base stations exchaging transmit and receive signals using time division duplex transmissions and is also applicable to frequency division duplex (FDD) transmissions.

The present RF repeater is useful in particular in telephone systems employing cable television plant as a signal conduit but may also be employed in cordless telephone systems utilizing dedicated coaxial cable and/or fibre optic and/or microwave signal conduits.

BACKGROUND ART

It is expected that Personal Communication Services (PCS) microcells will be supporting a rapidly increasing number of handsets in North America in the near future. To support this user base it is essential that the PCS microcells be both low power to assist frequency re-use and low cost, because the net capital costs of the PCS microcells will be a major factor in the economic viability of PCS.

What has been suggested by a number of organizations is that existing cable television distribution plant be used to interconnect microcell equipment. Taking advantage of the broadband and the nearly ubiquitous nature of cable plant, it has been further proposed that the microcell equipment consist of simple RF repeaters that translate off-air mobile voice traffic onto the cable plant and vice versa.

This approach uses the cable plant as a RF combining/splitting network since it preserves the basic RF amplitude and phase/frequency information. What has become apparent in tests is that this approach to PCS microcells yields both low capital costs and improved user service.

In summary, the low cost arises from the combination of simple technology, i.e. an RF repeater, using an existing asset base i.e. cable plant in a fashion that allows modulation/demodulation and public switched telephone network (PSTN) interface equipment to be centrally located. This allows these equipment costs to be amortised over a very large net coverage area.

The improved service arises from better call blocking probability associated with the ability to centralize the base station equipment rather than a priori allocation to specific microcells. Additionally, the cable plant can act to form distributed antenna arrays that can be shaped into "roamer corridors". Within these roamer corridors it is also possible to control the off-air dynamic range so as to reduce near user/far user interactions and line of sight blocking.

FIG. 1 illustrates the principal hardware elements and concepts of a prior art cordless telephone system employing base stations.

Base stations 1 operate at the off-air frequencies and perform demodulation and modulation functions for the telephone signals. The base stations 1 interface directly to twisted pair telecom lines.

The base stations 1 can be mounted to interface directly with nearby handsets (not shown), or can be located at a central site, as shown, where their ability to handle calls can be amortised over a larger network of microcells connected by TV cable plant, as mentioned above.

A remote antenna signal processor RASP 2 is located at the central site and interfaces one of the base stations to cable plant 4.

Typically, signals from the base stations 1 travel over the cable plant to the handsets in the 200–450 Mhz band. Signals travelling in the reverse direction use the 5–30 Mhz return band on the cable plant.

Bi-directional distribution amplifiers 6 need to be compatible with the cable plant 4 and provide return band capability.

Remote antenna drivers (RADs) 8 must be compatible with existing TV cable plant and they may be configured for either coaxial cable or fiber plant.

RADs 8 pick-up the off-air signals and relay then back to a central site via the plant's return path, and also broadcast PCS signals on the cable forward path (200–450 Mhz) to nearby handsets, after suitable heterodyne operations.

This prior art RAD-RASP design suffers a number of limitations, which comprise, specifically:

The need to operate where there is cable television plant. Cable TV may be readily available for some residential markets, but less available or not at all available in public and business markets.

The need for compatibility with existing cable TV services. This requires the RAD-RASP units to use expensive heterodyne processing to interface time division duplex off-air signals to the frequency division duplex cable TV plant.

The RAD-RASP arrangement is inappropriate in some markets, e.g. those served by existing cordless base stations and those with predominately buried cable plant.

Furthermore, with such a system the voice quality within a distributed antenna can suffer some degradation from the differences in phase noise of its constituent parts and from the differences in time delay of its constituent parts. In some circumstances, therefore, it is preferable to use RF repeaters, transferring signals by a time division duplex protocol, instead of RADs, which employ frequency division duplexing.

Prior art RF repeaters have required two amplifiers, for amplifying the transmit signals and the receive signals, respectively, in each RF repeater.

In European Patent Application No. 442,259, there is disclosed a regenerative RF bi-directional communication system employing cascaded amplifier stages for periodically regenerating signals which are transmitted and received along a series of radiating cable lengths, which link base station transceivers to hand-held or like mobile communication units. The amplifier stages are configured so that the overall intermodulation generated by this system is substantially independent of the number of the amplified stages and an intermediate frequency distribution system is used so that the required level of amplification is achieved through the cascaded amplifier stages at the level of low-power IF signals generated from the original RF signals in conjunction with appropriate oscillator and pilot signals. This restricts the cascading effect occurring due to the plurality of cascaded amplifier stages on the relatively low-power IF signals, thereby producing a negligible amount of intermodulation. It is, however, a disadvantage of such system that radio signals radiated from one cable length may be received by an immediately preceding or succeeding cable length and, therefore, may impair the signal carried by the latter.

From French Patent 2482339, it is known to employ a radio link between successive stations.

U.S. Pat. No. 4,234,959 discloses a mobile repeater system in which reception of a tone coded signal from a portable raises a squelch threshold in two priority repeaters at adjacent locations, which are out of range of one another but not out of range out of each others portable units. The portable-two-repeater range is thus decreased, without decreasing the repeater-two-repeater range. Interference caused by simultaneous transmission is eliminated, since only the appropriate repeater is activated.

Disclosure of the Invention

It is an object of the present invention to provide a novel and improved RF repeater for use in TDD cordless telephone systems, which avoids the need for separate amplifiers for amplifying the transmit and receive signals.

It is a further object of the present invention to provide a novel and improved RF repeater arrangement employing a chain of TDD RF repeaters to form a roamer corridor along which a handset may travel while maintaining communications.

According to one aspect of the present invention, an RF repeater for interfacing with a base station for exchanging transmit and receive signals in a time division duplex cordless telephone system comprises first signal exchange means for exchanging the transmit and receive signals with the base station, second signal exchange means for exchanging the transmit and receive signals with a cordless handset, a multicarrier amplifier having an input and an output, and switch means connected to said amplifier output, said amplifier input and said first and second signal exchange means and having first and second switch states. The switch means connects the second signal exchange means to the amplifier input and the amplifier output to the first signal exchange means in the first switch state and connects the first signal exchange means to the amplifier input and the amplifier output to the second signal exchange means in the second switch state. Also, means are provided for controlling the operation of the switch means so that the transmit and receive signals are alternately amplified by the amplifier.

In a preferred embodiment of the invention, a diode detector compares the receive signal and noise from a known noise source to provide an AC waveform, which is then amplified and compared with a reference value by means of a comparator which, when the receive signal power is below a predetermined level, operates the switch means to squelch the receive signal passed to the base station.

The RF repeater according to the present invention has a number of advantages.

Firstly, the number of amplifier elements required in the RF repeater are reduced, and the overall cost and size of the RF repeater are correspondingly reduced.

In addition, the present invention affords excellent power efficiency since the amplifier is always in use, while the repeater arrangement is in operation, whereas in the prior art RF repeaters, using separate transmit and receive amplifiers, the amplifiers are used only periodically, and for the rest of the time they consume power and dissipate heat without providing any benefit.

A further advantage of the present invention is that it can be readily configured as an in-line RF repeater, i.e. it may be connected with other similar RF repeaters to increase the size of the coverage zone serviced by the respective base station. Also, the voice quality in any distributed antenna array provided by the RF repeaters need not suffer from degradation due to differential phase noise or differential time delay.

According to another aspect of the present invention, there is provided an RF repeater arrangement for a time division duplex (TDD) cordless telephone system, comprising a chain of TDD RF repeaters which comprises at least a first RF repeater and a second RF repeater, with a dedicated signal link for exchanging transmit and receive signals between successive ones of the RF repeaters in the chain. The first and second RF repeaters each have a respective antenna for exchanging the transmit and receive signals with a TDD handset as radio signals, the antennas having coverage zones which overlap to form a roamer corridor over which the handset can roam while maintaining radio communications with the first and second RF repeaters.

Preferably, the signal link comprises means for exchanging radio signals between the first and second RF repeaters, and the radio signal exchanging means may comprise means for exchanging the transmit and receive signals between the first and second RF repeaters at the same frequency at which said transmit and receive signals are exchanged between the first and second RF repeaters and the handset.

The means for exchanging radio signals may include a co-axial cable extending from the first or second RF repeaters for locating the radio signal exchanging means and the antennas relative to one another so as to counteract signal leakage therebetween.

In another embodiment of the invention, the signal link comprises a cable interconnecting the first and second RF repeaters.

The chain may terminate at a terminal RF repeater having no means for forming a signal link with any succeeding RF repeater, and signal amplifier means may be included in the signal link to permit increased separation of the first and second RF repeaters.

BRIEF DESCRIPTION OF THE DRAWINGS

The present invention will be more readily apparent from the following description when taken in conjunction with the accompanying drawings, in which.

BEST MODE FOR CARRYING OUT THE INVENTION

Figure 1:
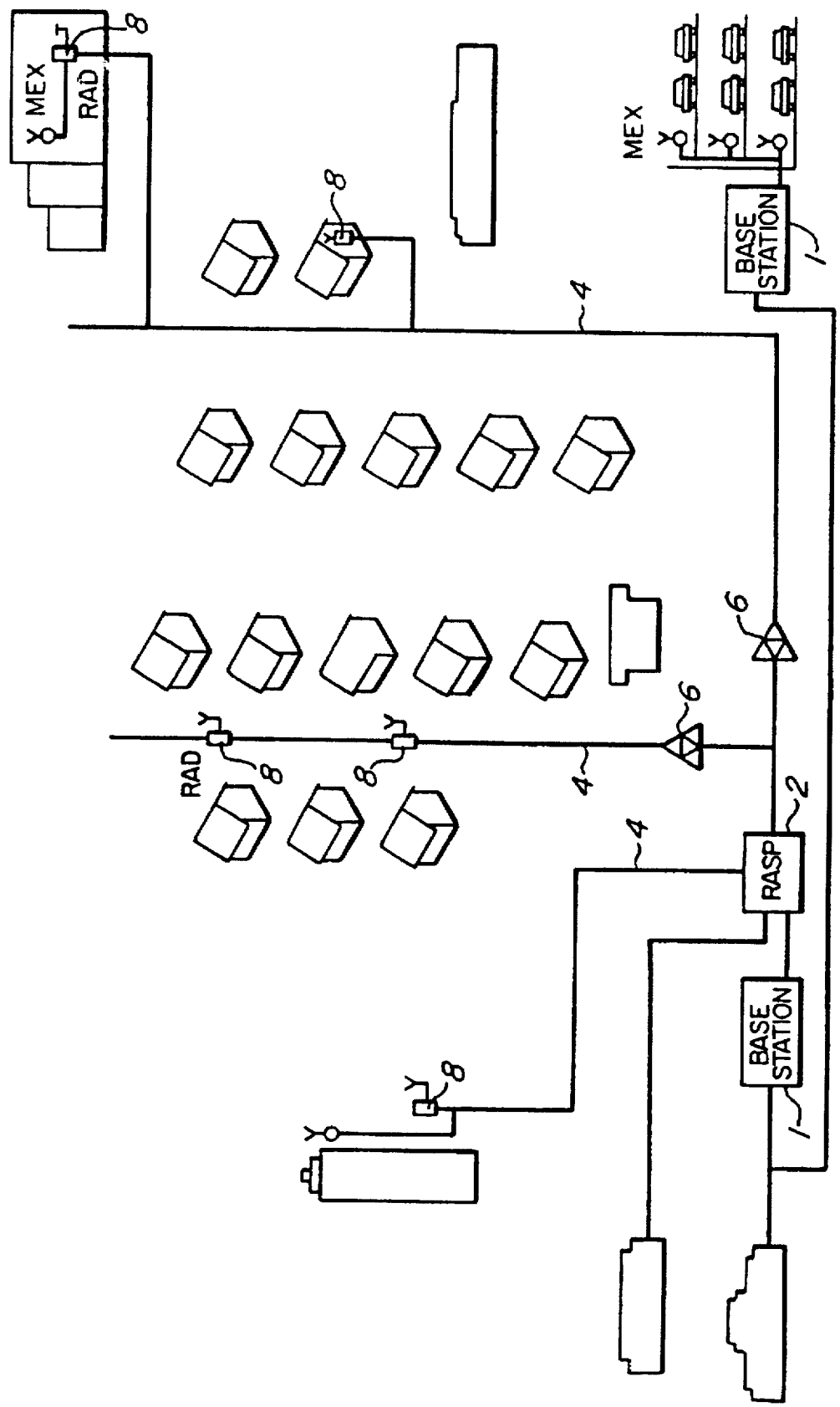
FIG. 1 diagrammatically illustrates a prior an cordless telephone system as described above.
Figure 2:
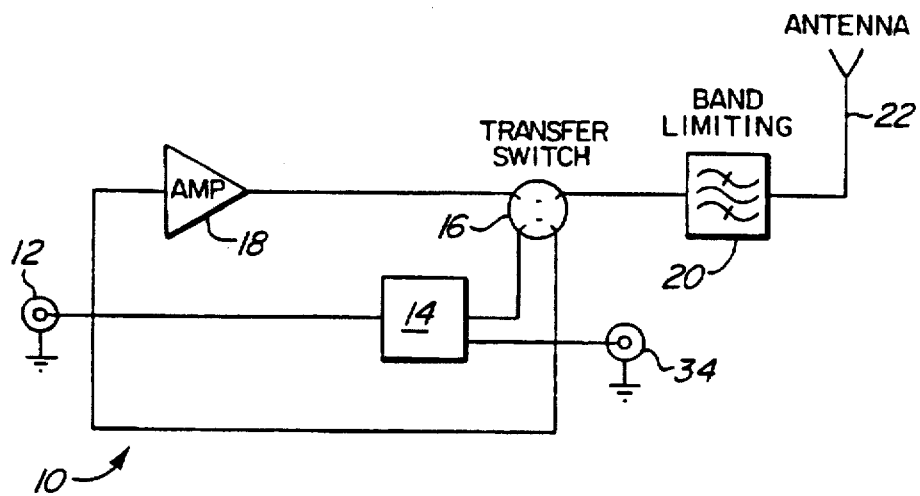
FIG. 2 shows a block diagram of an RF repeater according to a first embodiment of the present invention.

The RF repeater illustrated in FIG. 2 and indicated generally by reference numeral 10, has a coaxial cable input and output 12 connected to a component 14 which is in turn connected to one terminal of a transfer switch 16. A coaxial cable (not shown) forms a signal conduit from a base station (not shown) to the cable terminal 12.

The transfer switch 16 has three other switch terminals, of which two are connected to the input and the output, respectively, of an amplifier 18, while the third is connected through a band limiting filter 20 to an antenna 22.

The transfer switch 16 has two switch states.

In the first switch state, as illustrated in broken lines in FIG. 2, the transfer switch 16 connects the component 14 to the input of the amplifier 18, and also connects the output of the amplifier 18 to the band limiting filter 20 and the antenna 22.

In its second switch state, the transfer switch 16 connects the component 14 to the output of the amplifier 18, and also connects the antenna 22, through the band limiting filter 20, to the input of the amplifier 18.

It will be apparent that, in the first switch state of the transfer switch 16, the amplifier 18 serves to amplify a transmit signal passing from the coaxial cable to the antenna 22, whereas in the second switch state, the transfer switch 16 serves to amplify an incoming receive signal passing from the antenna 22 to the coaxial cable.

Figure 3:
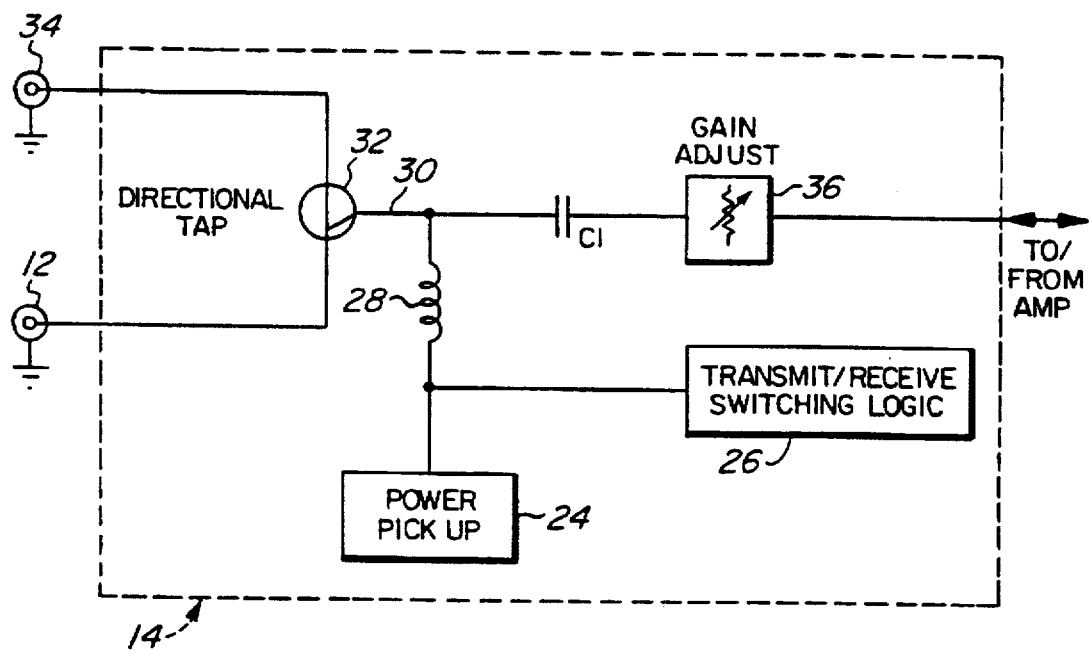
FIG. 3 shows a block diagram illustrating in greater detail a part of the RF repeater of FIG. 2.

The component 14 is illustrated in greater detail in FIG. 3, in which a power pickup 24 is shown, which serves to supply power to the component 14.

FIG. 3 also shows a transmit/receive switching logic circuit 26 which, together with the power pickup 24, is connected through an RF choke 28 to a conductor 30 and which control the changeovers of the switch state of the transfer switch 16 in response to timing signals from the basestation.

The coaxial cable input and output terminal 12 is connected to a directional tap 32 at one end of the conductor 30, and the directional tap 32 is also connected to a coaxial cable loop-through terminal 34, by which the RF repeater 10 can be connected in parallel with one or more other such RF repeaters.

The directional tap 32 is connected through a DC blocking capacitor C1 and a gain adjustment circuit 36 to the transfer switch 16.

The RF repeater of FIG. 2 may readily be simplified to serve as a terminator of the signal conduit comprising the coaxial cable (not shown) connected to the cable input and output terminal 12. For this purpose, the directional tap 32 and the loop-through terminal 34 are omitted, and the cable input and output terminal 12 is connected directly to the conductor 30.

Figure 4:
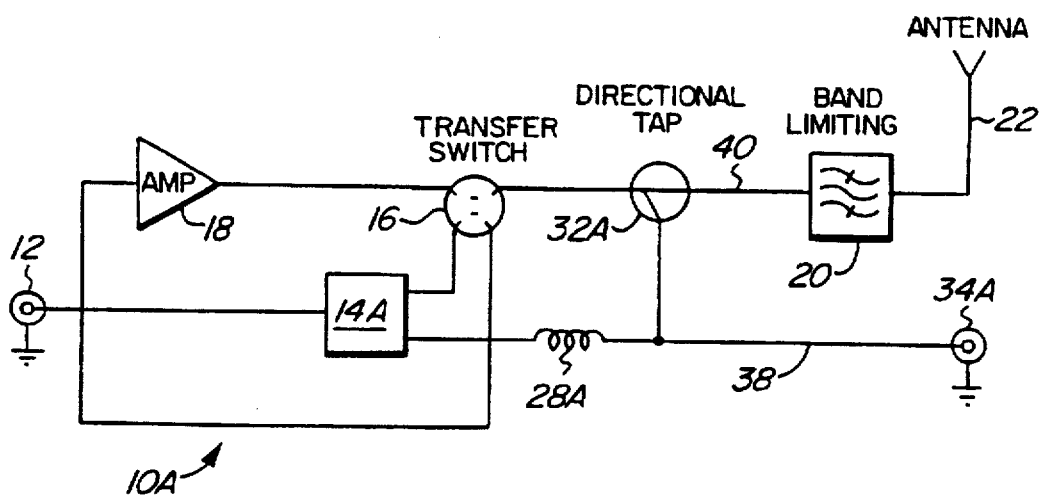
FIG. 4 shows a block diagram of an RF repeater according to a second embodiment of the present invention.

The modification of the RF repeater illustrated in FIG. 4 and indicated generally by reference numeral 10A has the component 14 replaced by a component 14A, which is connected to the transfer switch 16 and which is also connected, through an RF choke 28A and a conductor 38, to a coaxial cable loop-through terminal 34A, which corresponds to the terminal 34 of FIG. 3 and which is used for connecting the RF repeater 10A in line with one or more similar RF repeaters.

The conductor 38 is connected through a directional tap 32A to a conductor 40 which interconnects the transfer switch 16 and the band limiting filter 20.

Figure 5:
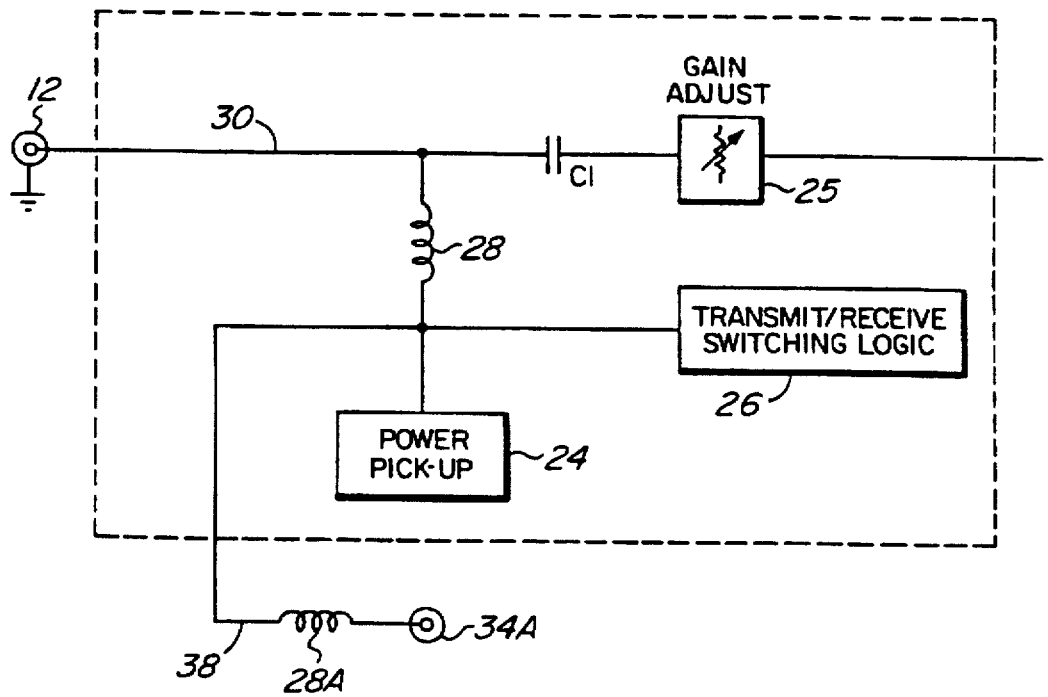
FIG. 5 shows a block diagram of a part of the RF repeater of FIG. 4.

As can be seen from FIG. 5, the conductor 30 is, in this case, connected directly to the coaxial cable input and output terminal 12, and the outputs of the power pick-up 24 and the transmit/receive switching logic circuit 26 are connected at the output of the component 14A to the conductor 38.

Figure 6:
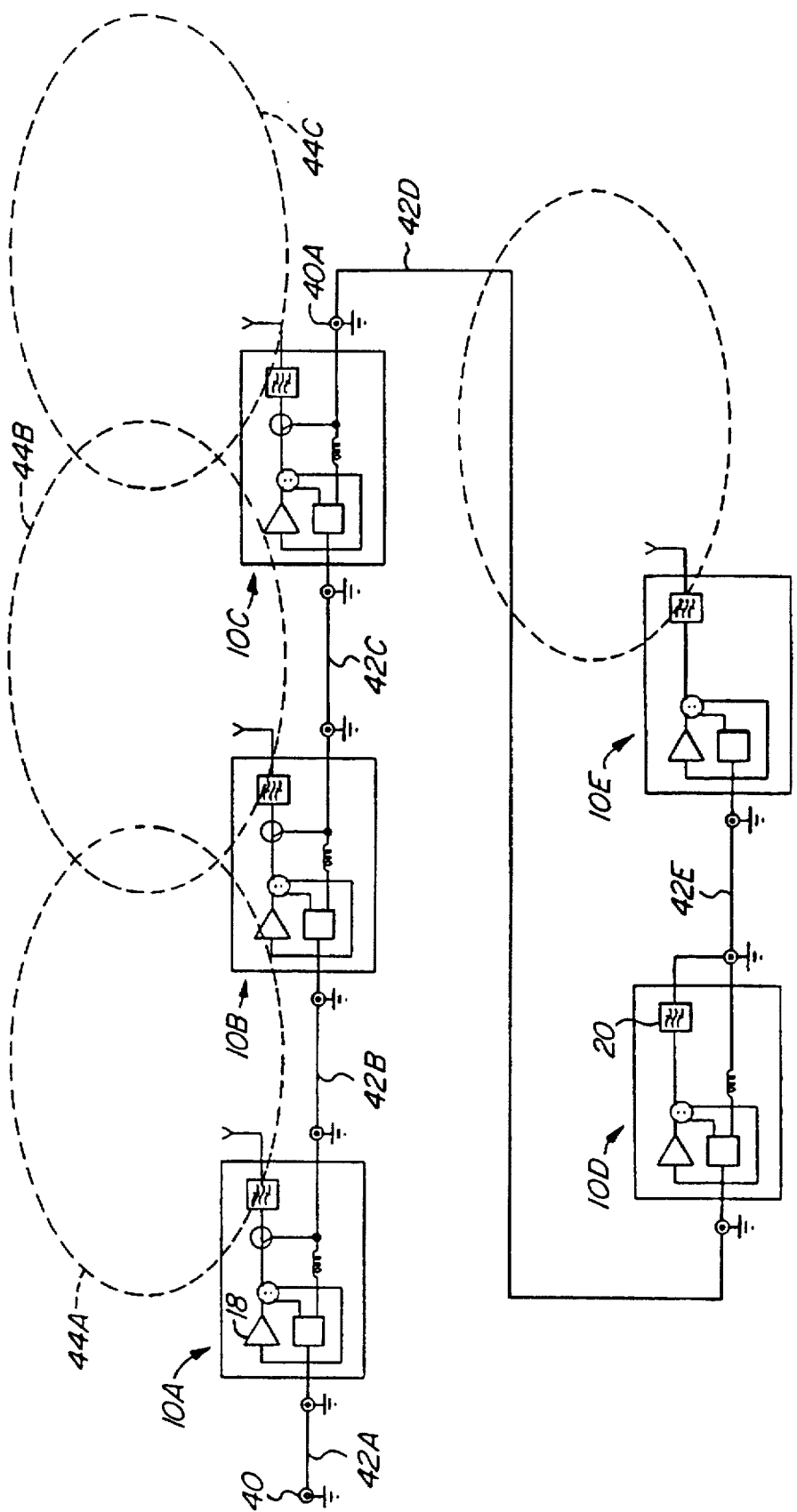
FIG. 6 shows an arrangement of three of the RF repeaters, similar to that of FIG. 4, connected in cascade by intermediate coaxial cables.

FIG. 6 shows an arrangement of five RF repeaters 10A–10C arranged in line and connected to one another and to a coaxial cable input and output terminal 40, of the transfer switch 16 in for connection through the cable TV plant 4, serving as a first signal link, to the base station. coaxial cables second signal links comprising 42A–42E, which typically may have a length of 400 feet, except for the coaxial cable 42E, which may be longer and may, for example, be 500 feet in length.

As can be seen in FIG. 6, the RF repeaters 10B–10E are similar to the RF repeater 10A. It is, however, alternately possible to replace these RF repeaters by RF repeaters such as the RF repeater 10 of FIG. 2.

In embodiment of the invention shown in FIG. 6, the RF repeaters 10A–10C and 10E are each provided with the antenna 22 for exchanging off-air signals with the handsets (not shown). However, the RF repeater 10D is arranged and employed as a time division duplex line amplifier, to provide gain on the coaxial cable 42E, and therefore has the band-pass filter 20 connected to the coaxial cable 42E instead of to an antenna.

Also, the RF repeater 10E has no loop-through terminal.

As is also apparent from FIG. 6, the coverage zones 44A–44C of the RF repeaters 10A–10C are arranged in a distributed antenna array, and overlap one another, so that the cordless handsets communicating through the RF repeaters 10A, 10B and 10C can move from one of these zones to another, without need for additional call hand-off processing.

Figure 7:
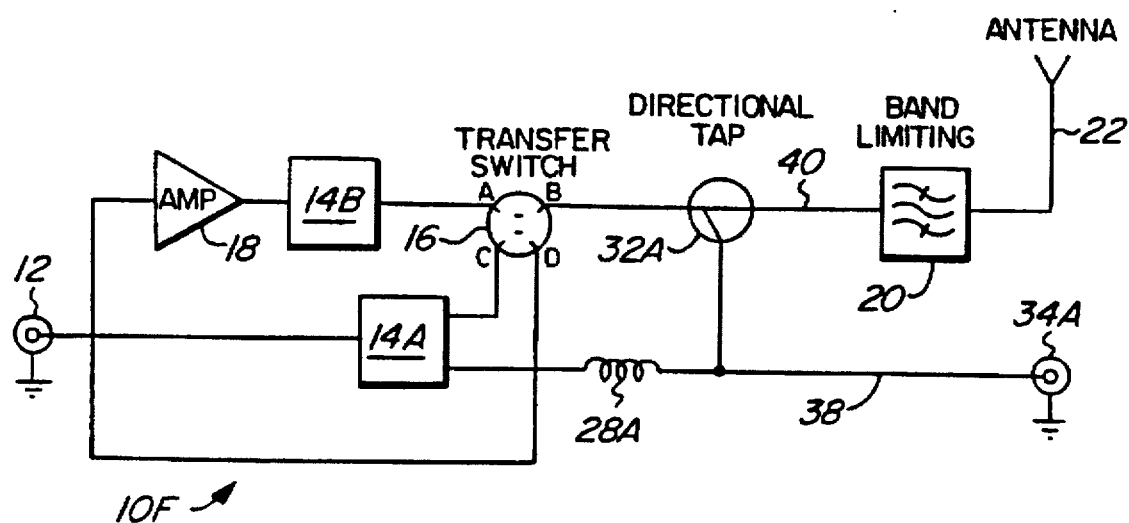
FIGS. 7 and 7A show block diagrams of two modifications of the RF repeater of FIG. 4.

FIG. 7 shows a modification, indicated generally by reference numeral 10F, of the RF repeater 10A of FIG. 3. The modified RF repeater 10F has an additional component 14B inserted between the output of the amplifier 18 and the transfer switch 16.

The component 14B is a power detector circuit, which is provided for determining the power of the receive signal from the antenna 22 and for squelching the RF repeater when the power falls below a predetermined value. In an alternative embodiment, which is not shown, the power detector circuit 14B may be inserted within the interstage gain elements of the amplifier 18.

Figure 8:
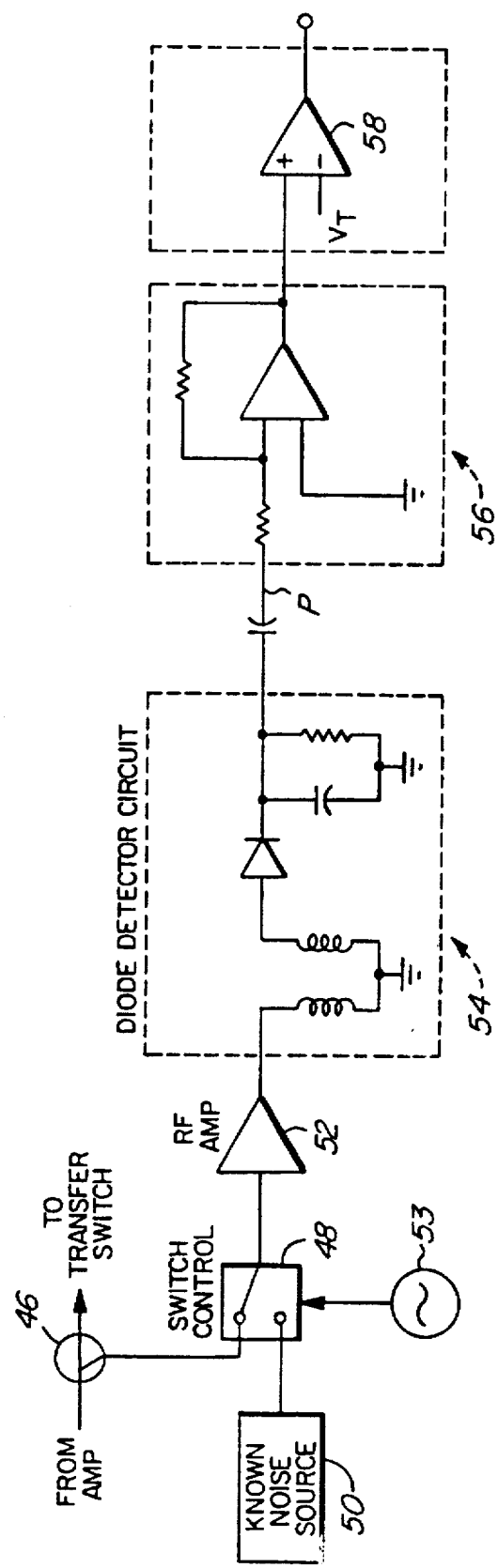
FIG. 8 shows a circuit diagram of part of the RF repeater of FIG. 7.

As shown in FIG. 8, the power detector circuit 14B is connected to the amplifier 18 and the transfer switch 16 through a directional tap 46. A switch control 48 serves to connect the signal and noise at the tap 46, and a known noise source 50, to the input of an RF amplifier 52.

An oscillator 53 provides a switch control waveform $S_1$ (FIG. 8A) to the switch control 48, so that the RF amplifier 52 alternately receives a sample signal $S_2$ (FIG. 8B) from the known noise source 50 and the signal and noise, indicated by $S_3$, from the tap 46.

The output of the RF amplifier 52 is connected to a diode detector circuit indicated generally by reference numeral 54, which rapidly samples both the band limited RF signal and noise $S_3$ from the tap 46 and the sample signal $S_3$ from the known noise source 50.

Figure 8B:
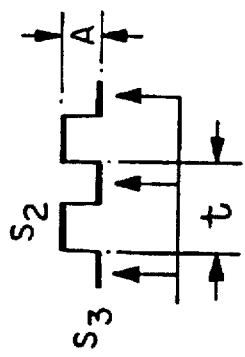
FIGS. 8A and 8B show wave forms of signals in the circuit of FIG. 8.
Figure 8A:
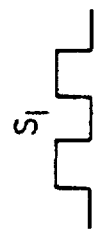

As a consequence of the switching action of the switch control 48, an AC baseband waveform, which is illustrated in FIG. 8b, is produced at point P at the output of the diode detector circuit 54.

The detector output signal has a period t which is defined by the switch control 48, and has an amplitude A, which corresponds to the level of the signal and noise passing through the tap 46 from the amplifier 18 in comparison to the level of the sample signal $S_2$ from the known noise source 50. The period t is selected to be sufficiently large to allow the operational amplifier 52 to have gain at the switching rate and to be sufficiently small so as to not interact with the time division duplex signal rates of the transmit and receive signals.

This signal is then amplified by an operational amplifier circuit 56, which has a large AC gain at the switching frequency, and the output of which is connected to one terminal of a comparator 58.

A reference voltage $V_T$ is applied to the other input of the comparator 58, which compares the two values to provide an output signal on a comparator output 60. If the amplitude A is insufficient to exceed the threshold voltage $V_T$, the comparator output signal causes the transfer switch 16 to squelch the received signal that would otherwise be passed back over the coaxial output.

For squelch operation in a time division duplex amplifier, this arrangement presents a number of advantages:

1. Amplification of the AC baseband allows very large operational amplifier gains to be used without causing trouble with DC offsets or voltage rail limitation. Also, variations in the performance of the diode detector circuit 54 are of little consequence, since the comparator action depends on the diode performance referenced against the known noise source 50. Consequently, this arrangement is extremely sensitive and, therefore, suitable for squelch operations, that do not use complex heterodyning processing.

2. By locating the diode detector circuit 54 in the amplifier chain connected to the transfer switch 16, the diode detector circuit 54 can be used to measure power directed towards the antenna 22. This allows the possibility of employing the circuit for installation and setting up, and also automatic control, of the net amplifier gain.

3. The circuit can be used for automatic gain control of the gain in the reverse direction.

4. This arrangement utilizes low cost, simple components, particularly if coupled to microprocessor control of the comparator and switching functions. It is pointed out that the transfer switch 16 provides an easy and effective way to effect the squelching.

Since the amplifier 18 is not connected to the coaxial cable input/output terminal 12, it does not inject noise in the coaxial cable when the squelch is active.

In addition, it is pointed out that the RF repeater 10 of FIG. 2 can be modified by inclusion of the power detector circuit 14B between the amplifier 18 and the transfer switch 16 of FIG. 2.

Figure 7A:
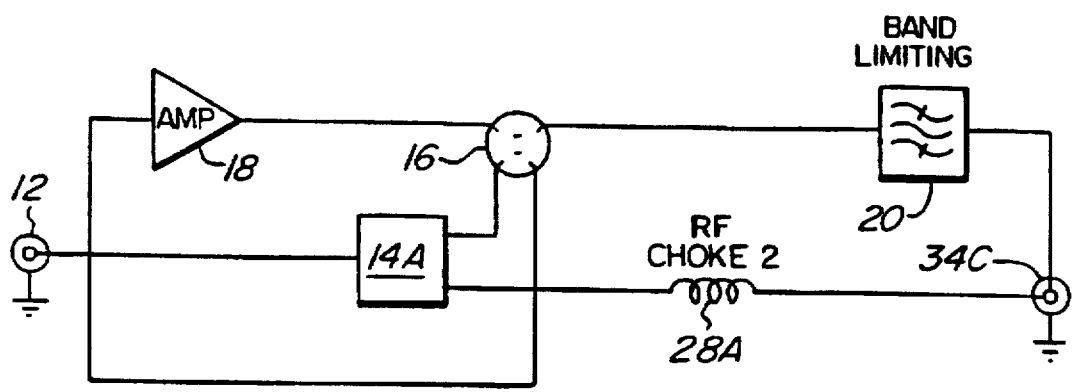

The RF repeater 10F of FIG. 7 may be modified, as illustrated in FIG. 7A; so as to serve as a time division duplex line amplifier in the signal conduit comprising the coaxial cable (not shown) connected to the coaxial cable input and output terminal 12. For this purpose, the antenna 22, the band limiting filter 20 and the directional tap 32A of FIG. 7 are omitted, and the transfer switch 16 is connected by conductor 61 to a further coaxial cable input and output terminal 34C. A further coaxial cable (not shown) is connected, as part of the signal conduit, between the terminal 12B and a further RF repeater (not shown) which may be similar, for example, to the RF repeater 10F of FIG. 7.

Figure 9:
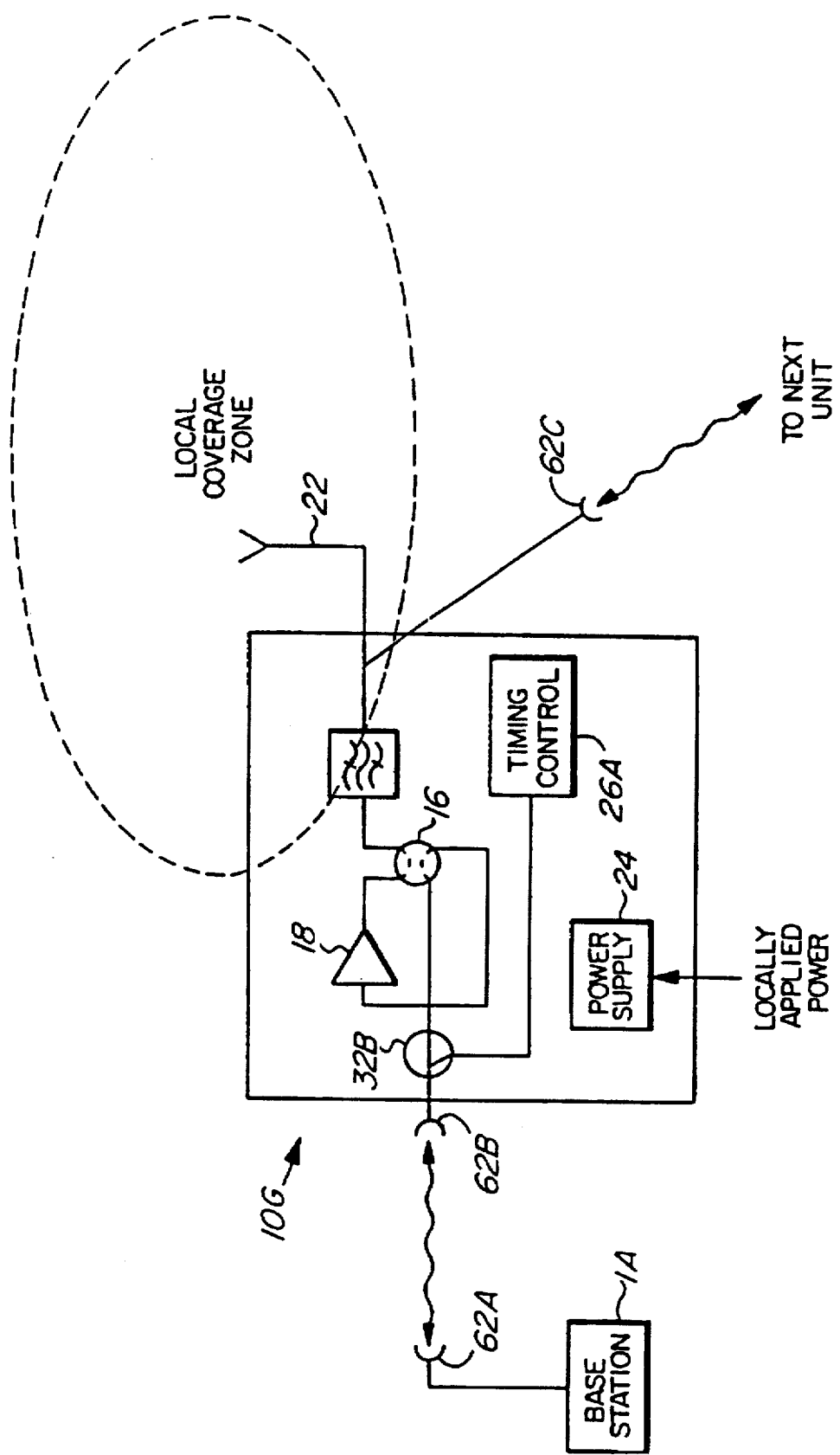
FIG. 9 and 9A show modifications of the RF repeater of FIG. 2 for use as on-channel repeaters.

FIG. 9 shows an RF repeater, indicated generally by reference numeral 10G, which is a further modification of the RF repeater 10 of FIG. 2.

More particularly the RF repeater 10G of Fibre 9 includes a power supply 24 for locally applied power and a timing control circuit 26A for generating locally the timing pulses for controlling the operation of the RF repeater. The timing control circuit 26A is connected to the signal conduit through a directional tap 32B.

Local timing is effected in this embodiment by means of control and signalling channels containing timing data.

It is, however, alternatively possible to employ local cellular, paging or TV signals to derive the timing for both the base stations and the off-air repeater.

In this embodiment, the base station, which is indicated by reference numeral 1A, communicates with the RF repeater 10E through antennas 62A and 62B having directional gain, and the RF repeater 10E in turn communicates with a further RF repeater through antennas, of which only one is shown and which is indicated by reference numeral 62C, which likewise have directional gain.

Figure 9A:
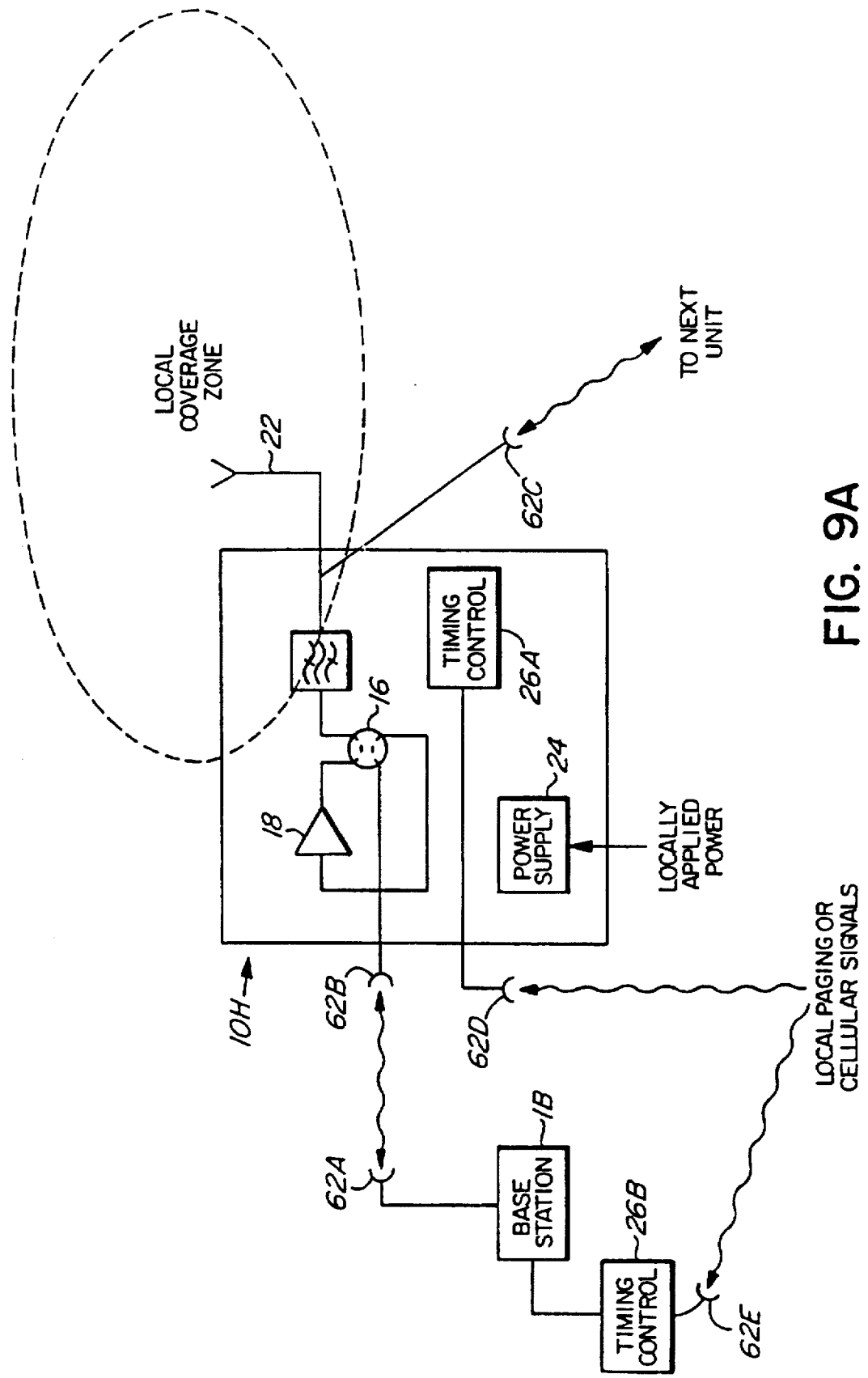

A modified arrangement of this type is illustrated in FIG. 9A, in which there is shown a further modified RF repeater 10H, with the timing control circuit 26A connected to antenna 62D. In this case, a further timing control circuit 26B is connected to the base station 1B, and provided with an antenna 62E. The antennas 62D and 62E serve to receive the local paging or cellular signals, or TV signals.

In order to avoid possible signal leakage between the antennas 62C and 22, a length of co-axial cable may be inserted between the RF repeater 10H and the antenna 62C so as to counteract such leakage by physical separation of the antennas 62C and 22 allowed by the length of the cable and/or the physical location of the antennas, and thus the relative location of the antennas, which may be arranged so as to locate a building or other obstruction between the antennas 62C and 22. In this way, it can be ensured that the coupling between the antennas is less than the gain of the RF repeater 10H, so that feedback problems are avoided. Similar measures may be taken to reduce or avoid coupling between the other antennas of the arrangement shown in FIG. 9A and also between the antennas of FIG. 9 and other embodiments of the present invention employing a signal link for exchanging the transmit and receive signals between RF repeaters and/or between an RF repeater and a base station or other component.

Also, while RF repeaters normally receive and output their signals at the same frequency, it may in some circumstances be advantageous to employ heterodyning in the signal links between RF repeaters and/or an RF repeater and its base station, and it is accordingly to be understood that the expression "RF repeater" as employed herewith may include heterodyne repeaters.

The embodiments of FIGS. 9 and 9A may usefully be employed, for example, when the off-air connection between the base station and the RF repeater is used to communicate over an intermediate area in which there is no right of way for coaxial cable or over which, for some other reason, it is not possible to employ co-axial cable, e.g. as described below with reference to FIG. 13.

An additional use for embodiments of FIGS. 9 and 9A is to provide for enhanced in-building mobile telephoning from a Base Station (or RAD), located outside the building.

In this application, the antenna 62B is located exterior to the building and communicates with the base station, while antenna 22 is inside the building. For such in-building applications, power is locally available (e.g. 110v as power outlet), and cable TV outlets may also provide the timing signals necessary to synchronize the base station and the RF repeaters.

The RF repeaters 10G and 10H may be modified for connection to one or more further RF repeaters as described above.

Figure 10:
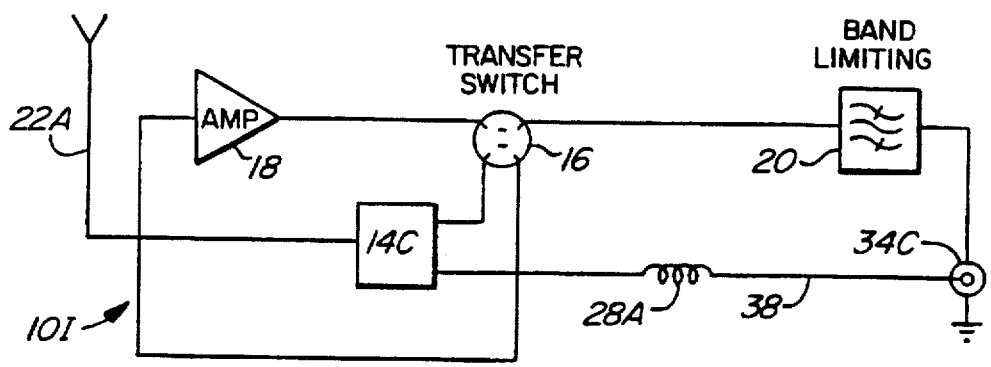
FIG. 10 shows a block diagram of a further modified RF repeater.
Figure 11:
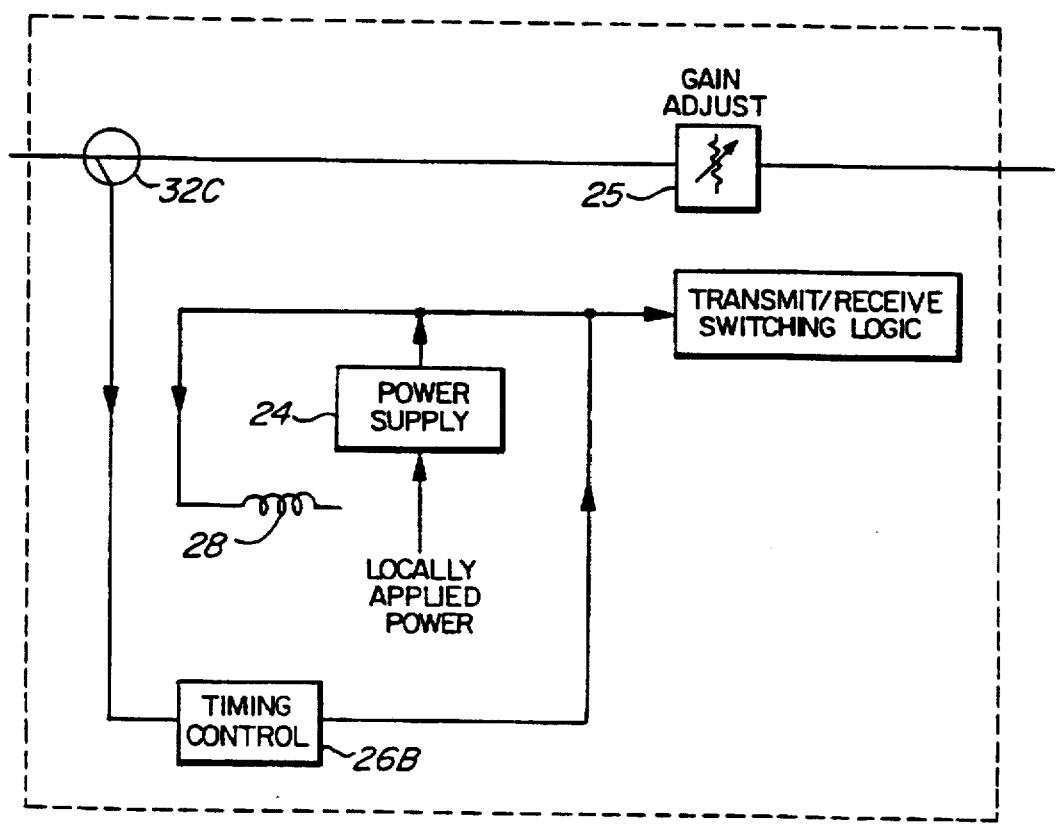
FIG. 11 shows a block diagram of a component of the RF repeater of FIG. 10.

FIG. 10 shows a further embodiment of the RF repeater according to the present invention, indicated generally by reference numeral 10I, and which is similar to the RF repeater 10A of FIG. 7A except that, in the case of the RF repeater 10I, the coaxial cable input and output terminal 12 is replaced by an antenna 22A, the component 14B is replaced by the component 14C, illustrated in FIG. 11, the antenna 22 is omitted and the band limiting filter 20 is connected to the loop-through terminal 34C.

Referring to FIG. 11, it will be seen that the signal conduit is connected through a directional tap 32C to a timing control circuit 26B, the output of which is connected to the transmit/receive switching logic 26.

The RF repeater 10I may serve as an off-air relay communicating with a base station, and also providing power and synchronization and communicating with further RF repeaters through the loop-through terminal 34A which is connected to a dedicated coaxial cable (not shown).

Figure 12:
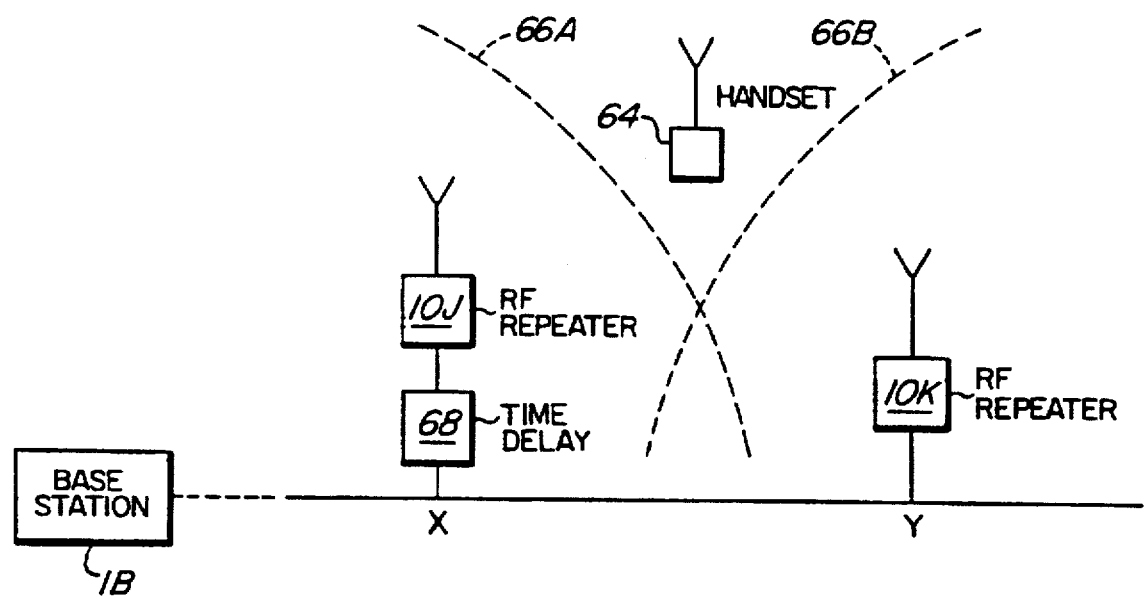
FIG. 12 diagrammatically illustrates the use of a time delay in an arrangement of two RF repeaters.

FIG. 12 illustrates a handset 64 which is located in the so-called "overlap zone" between the coverage zones 66A and 66B of respective RF repeaters 10J and 10K, which are connected to a base station 1B.

In such circumstances, it is possible for phasing effects to create a "null" in the overlap region, which varies in severity according to the differences in phase noise associated with the two RF repeaters 10F and 10G. By using a dedicated signal conduit, with no heterodyne operations, this differential phase noise is made negligible, thus improving voice quality.

Also, differential timing effects affect voice quality in the overlap zone. The time division duplex timing of the RF repeater 10J is dependent on the propagation delay of the path from point X to the handset 64. However, the analogous path for the RF repeater 10K is from the point X, through the point Y to the handset 64. To counteract the effect of these different point lengths, a time delay element 68 is provided between point X and the RF repeater 10J. Without this time delay element 68, when the handset 64 is in the location in which it is shown in FIG. 12, it would be subjected to two versions of time division duplex timing, the two versions differing by an amount equivalent to the delay path XY. The magnitude of the time delay of the time delay element is selected so as to equalize the timing on the two paths.

Figure 13:
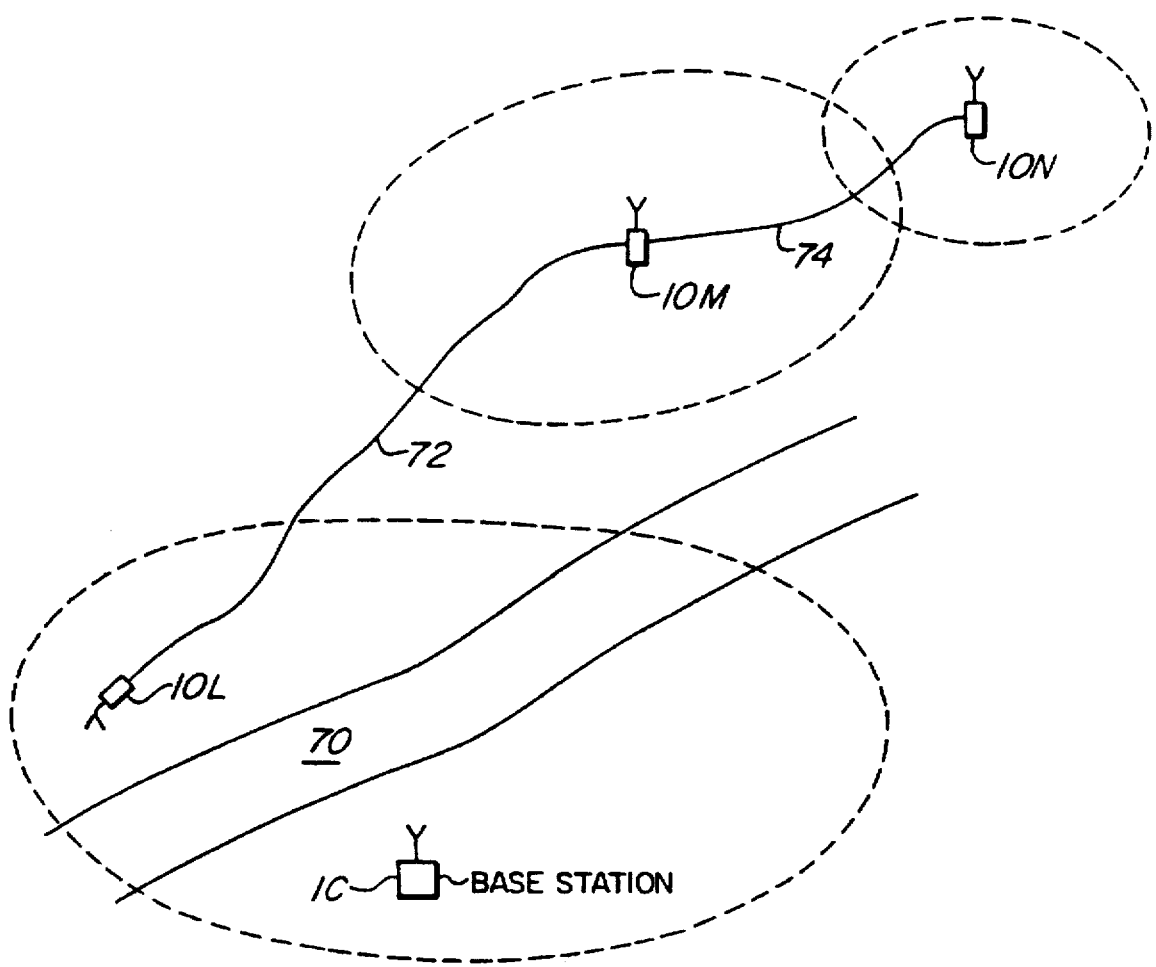
FIG. 13 shows an RF repeater arrangement with a base station communicating by a radio link with an RF repeater.

FIG. 13 shows a further possible embodiment of the present invention, in which a base station communicates by off-air (radio) signals with an RF repeater 10L over a highway 70. This arrangement avoids any necessity for a right of way between the base station 1C and the RF repeater 10L.

The RF repeater 10L is connected to a coaxial cable 72 to a further RF repeater 10M, which in turn is connected by a coaxial cable to a still further RF repeater 10N. The RF repeaters 10L–10N are implemented as described above with reference to the preceding figures.

The length of the coaxial cable 72 is sufficient to ensure RF stability, i.e. that there is no feedback from RF repeater 10L to RF repeater 10M or from RF repeater 10N to RF repeater 10L. Thus, for example, repeater 10L may be in a mode of receiving signals from the base station 10C while simultaneously relaying the signals and broadcasting them through RF repeaters 10M and 10N.

Because of the isolation afforded by the distance between the RF repeater 10L and the RF repeaters 10M and 10N, directive antennas are not a necessity, for operational stability in this arrangement.

As will be apparent to those skilled in the art, various modifications may be made in the above described embodiments of the invention within the scope of the appended claims. For example antenna diversity may be employed at the RF repeater by adding a second switched antenna, commanded by a base station.

However switched-antenna diversity is awkward in an RF repeater arrangement, because in many instances the base station needs access to signals from both antennas, necessitating the use of two coaxial cable runs and two RF repeaters.

Figure 14:
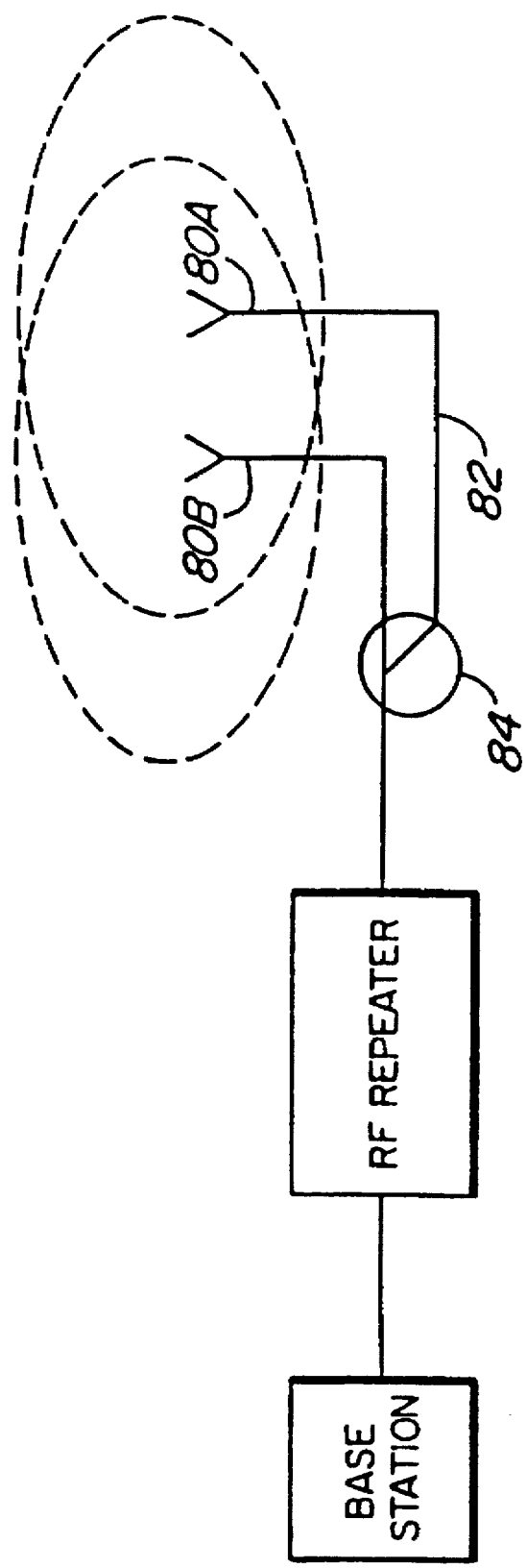
FIG. 14 shows an RF repeater arrangement employing a coupled antenna pair.

An alternate arrangement, which has been found by the inventor to give nearly as good performance as switched antenna diversity, is shown in FIG. 14.

In FIG. 14, the RF repeater communicates with local handsets (not shown) via the first antenna 80A, which is connected to the RF repeater via the throw leg 82 of a conventional 10 db. directional coupler 84. However the coupled leg is also connected to a second antenna 80B, physically located some distance from the first antenna.

Should a mobile handset move into a multipath null of the first antenna 81A, this will typically cause the signal level at the RF repeater to drop 20–30 db, potentially destroying the RF link. However it is unlikely that the handset location would also be a multipath null for the second antenna 81B, with the consequence that the composite drop in signal level will be only 10 db, and thus the link will be sustained.

The selection of a 10 db coupler is preferred because large coupling values (e.g. 20 db), will give poor composite multipath performance, while smaller coupling values (e.g. 3 db), will cause the two antennas 81A and 81B to interact and substantially shape the composite antenna pattern.

While the above-described embodiments of the invention do not employ heterodyne operation, it is envisaged that such operation may be employed in implementing the present invention, particularly for mobile telephoning where the RF signal is at a very high frequency (e.g. 1.9 GHz), and as a consequence the coaxial cable losses associated with one frequency RF repeaters are high.

I claim:

1. A time division duplex RF repeater arrangement comprising:

a first time division duplex RF repeater;

a first signal link for exchanging time division duplex transmit and receive signals between said first time division duplex RF repeater and a basestation;

a second time division duplex RF repeater;

a second signal link for exchanging the transmit and receive signals between said first and second time division duplex RF receivers;

said first and second time division duplex RF receivers each having an antenna for exchanging the transmit and receive signals with a mobile cordless time division duplex handset as radio signals; and said antennas having coverage zones which overlap one another;

each of said first and second time division duplex RF repeaters having a single amplifier and a transfer switch connected to pass the transmit signals to said amplifier in a first switch state of said transmit switch and to pass the receive signals to said amplifier in a second switch state of said transmit switch, whereby the transmit signals and the receive signals are amplified by said single amplifier.

2. A time division duplex RF repeater arrangement as claimed in claim 1, wherein said first and second time division duplex RF repeaters each includes means responsive to timing signals from the basestation for controlling changeover of its transfer switch from the first switch state to the second switch state and vice versa.

3. A time division duplex RF repeater arrangement as claimed in claim 1, wherein at least one of said first and second time division duplex RF repeaters is located within a building for providing communication within the building, and wherein a remote antenna is provided at the exterior of the building and a further signal link connects said remote antenna driver to one of said first and second time division duplex RF repeaters for exchanging the transmit and receive signals with the latter.

4. A time division duplex RF repeater arrangement as claimed in claim 1, wherein said first signal link comprises a cable TV plant.

5. A time division duplex RF repeater arrangement as claimed in claim 1, wherein said second signal link comprises means for exchanging the transmit and receive signals as radio signals between said first and second time division duplex RF repeaters.

6. A time division duplex RF repeater arrangement as claimed in claim 5, wherein said radio signal exchanging means comprise means for exchanging the transmit and receive signals between said first and second time division duplex RF repeaters at the same frequency at which the transmit and receive signals are exchanged between said first and second time division duplex RF repeaters and the mobile cordless handset.

7. A time division duplex RF repeater arrangement as claimed in claim 5, including co-axial cable extending from said first time division duplex RF repeaters for locating said radio signal exchanging means and said antenna of said first time division duplex RF repeater relative to one another so as to counteract signal leakage therebetween.

8. A time division duplex RF repeater arrangement as claimed in claim 1, wherein said second signal link comprises a co-axial cable connecting said first and second time division duplex RF repeaters.

* * * * *